Patented Sept. 2, 1947                                                    2,426,646

UNITED STATES PATENT OFFICE

2,426,646

PROCESS FOR PRODUCING MERCAPTANS FROM OLEFINS AND HYDROGEN SULFIDE

Walter A. Schulze, Bartlesville, Okla., assignor to Phillips Petroleum Company, a corporation of Delaware No Drawing. Application July 3, 1943,
Serial No. 493,463

13 Claims. (Cl. 260—609)

This invention relates to the production of alkyl mercaptans through the interaction of hydrogen sulfide and selected olefins in the presence of a solid contact catalyst. In one specific embodiment this invention involves the catalytic addition of hydrogen sulfide to olefinic hydrocarbons of 8 to 10 or more carbon atoms to produce predominately high boiling mercaptans of exceptional value as synthetic rubber modifiers.

The synthesis of aliphatic mercaptans through the direct addition of hydrogen sulfide to olefins with and without the presence of catalyst is a well established reaction. Thus it is possible under relatively severe conditions of temperature and pressure to bring about the reaction of hydrogen sulfide and olefins. However under such conditions side reactions producing thio ethers and saturated hydrocarbons seriously interfere with the yield of mercaptan. Since temperatures on the order of 500° F. and higher are required for straight thermal reaction, application to the production of the higher mercaptans is not feasible due to the thermal instability of the desired product.

Catalytic processes with particular emphasis on the manufacture of low molecular weight mercaptans have been advanced. Recommended solid contact catalysts include: metallic sulfides, fuller's earth, silica gel and charcoal. The activity of these catalysts leaves much to be desired since temperatures of 400–500° F. are often necessary to effect reaction at a practical rate. Adsorptive clays of the fuller's earth type have been proposed as catalysts for this reaction. Such catalysts are in some cases suitable for the production of relatively low molecular weight mercaptans because of their pronounced depolymerizing activity toward the higher olefins. However this property often results in an inefficient process when high boiling mercaptants are desired. In general, it may be stated that the adsorption catalysts thus far proposed for the olefin-hydrogen sulfide reaction are deficient in activity and especially in specificity in the production of mercaptans containing 12 or more carbon atoms per mol of mercaptan.

It is an object of this invention to provide an improved process for the addition of hydrogen sulfide to olefinic hydrocarbons. A further object of this invention is to react olefins with hydrogen sulfide. Another object of this invention is to provide a process for the manufacture of high-boiling mercaptans by the direct addition of hydrogen sulfide to olefins containing 8 or more carbon atoms per molecule. Still another object of this invention is to provide an improved process utilizing an adsorptive contact catalyst of such specificity and activity that high boiling olefins can be converted to the corresponding mercaptans with a minimum of depolymerization and other undesirable side reactions. Other objects and advantages of this invention will become apparent, to one skilled in the art, from the accompanying disclosure and discussion. The process disclosed is of particular value in the manufacture of high-boiling mercaptans which are exceptionally desirable modifiers in the manufacture of synthetic rubber of the Buna type, such as copolymers of diolefins with vinyl compounds such as styrene, acrylonitrile, esters of acrylic acid, etc.

It has now been found that the olefin-hydrogen sulfide reaction, as applied to C8 and higher olefins to produce high-boiling mercaptans, is smoothly effected in the presence of solid adsorptive catalysts comprising silica and an oxide of metal of group IIIB or IVA of the periodic system. As listed in "Modern Inorganic Chemistry," by J. W. Mellor (Longmans, Green & Co., 1939, revised and edited by G. D. Parkers), on page 118, group IIIB consists of boron, aluminum, gallium, indium and thallium, and group IVA consists of titanium, zirconium, hafnium and thorium. The catalyst is preferably employed in the form of synthetic precipitated silica gel promoted by relatively minor proportions of the metal oxide. Such catalysts have heretofore been used to promote olefin polymerization and various high temperature cracking reactions, but the process of the present invention involves a novel adaptation in the field of mercaptan synthesis. The preferred moderate reaction conditions disclosed herein, the highly specific nature of the olefin-hydrogen sulfide reaction over the silica-alumina catalysts and the virtually complete absence of depolymerization and desulfurization represents a distinct improvement over the existing art in the field of mercaptan synthesis.

The addition of H2S to the higher olefins over the catalysts of this invention is also extended to the use of lower molecular weight olefins; however, the latter are not full equivalents in the operations described. A definite gradation in reactivity exists between the lower and higher members of the aliphatic olefin series thus requiring somewhat different conditions for efficient conversion to the corresponding mercaptans.

The process of the present invention comprises the contacting of controlled proportions of an olefinic hydrocarbon, or olefinic hydrocarbon mixtures, such as mixtures of dodecylene and higher homologs, and hydrogen sulfide with an adsorbent silica-metal oxide gel-type catalyst under conditions selected to produce a substantial conversion of the olefin or olefins to the corresponding mercaptans. The hydrocarbon-hydrogen sulfide feed mixture may be passed continuously through a stationary bed of granular catalyst, or otherwise contacted with the solid catalyst, and the catalyst effluent may be either continuously or intermittently fractionated to separate unreacted olefin and hydrogen sulfide from the product. Ordinarily an excess of hydrogen sulfide is present in the feed which may be returned to the catalyst along with fresh olefin.

In a specific preferred embodiment of the invention, a $C_{12}$–$C_{14}$ fraction, derived from the catalytic polymerization of $C_3$ and $C_4$ olefins, in admixture with the desired molar proportion of hydrogen sulfide is contacted with the catalyst under the following conditions: pressures ranging from about 100 to 1500 pounds gage; temperatures from about atmospheric to about 300° F.; catalyst comprising a silica-metal oxide gel such as silica-alumina; flow-rate of 1 to 10 liquid volumes per volume of catalyst per hour. Under the aforesaid conditions the principal reaction occurring is apparently addition of $H_2S$ to the olefinic linkages so that the combined sulfur is found in mercaptans corresponding substantially in boiling range to those expected from the composition of the olefin feed. The total effluent from the reaction zone is treated by conventional means for recovery of hydrogen sulfide and the unreacted hydrocarbon is fractionated out of the product. This latter operation is preferably accomplished under diminished pressure.

Operation according to this scheme may be either batch-wise or continuous, with the latter usually preferred. A plurality of catalyst cases may be provided in order to maintain uninterrupted operation during catalyst replacement or regeneration procedure. Instead of feeding hydrogen sulfide predissolved in the olefin charge, other means of introduction to the reaction zone may be employed. For example, hydrogen sulfide may be added at one or more points directly into the catalyst chamber in order to maintain a predetermined concentration at various points within the catalyst space. Temperature control within the catalyst space may be obtained by regulation of feed preheating means, or heat exchange devices may be provided within or about the catalyst.

The solid adsorbent catalysts which are a feature of the present process are most accurately described as dried gels, and are characterized by their chemical composition, their physical properties, and specific methods of preparation which account for their catalytic activity. Although these catalysts are broadly referred to as silica-metal oxide compositions, it is important to further define the origin, physical structure and chemical composition in order to differentiate the catalysts active in the present process from naturally occurring minerals which contain some of the same components but which have distinctly different catalytic properties under the terms of this invention. The preferred catalysts of this invention are of such a nature that it is possible to select conditions for the present process which provide excellent conversion of olefin to mercaptan without incurring extensive olefin decomposition. Thus the temperatures employed for this reaction are ordinarily below those supporting active depolymerization. If less active catalysts are employed at higher temperatures considerable olefin breakdown may occur with consequent formation of low-molecular weight mercaptans.

The natural and synthetic metal silicates, particularly aluminum silicates, were originally studied with regard to their polymerizing qualities, and it was noted that catalysts of superior activity resulted from synthetic preparations involving precipitation of the oxides in gel form and not necessarily in the proportions found in nature. It was also noted that when the gel structure was not produced or was destroyed that the physical and catalytic properties of the material were usually unsatisfactory. Suitable silica-alumina catalysts have been prepared by the methods described by McKinney in U. S. Patents 2,142,324 and 2,147,985 and employed in polymerization of gaseous olefins. The present invention enables the use of similar silica-gel catalysts activated with alumina and/or other metal oxides at temperatures appreciably below those employed in polymerization or depolymerization operations.

In general, these catalysts are prepared by first forming a hydrous silica gel or jelly from an alkali silicate and an acid, washing soluble material from the gel, treating or activating the gel with an aqueous solution of a suitable metal salt, and subsequently washing and drying the treated material. In this manner, a part of the metal, presumably in the form of a hydrous oxide or loose hydroxide compound formed by hydrolysis is selectively adsorbed by the hydrous silica, and is not removed by subsequent washing. This selective adsorption is attested by a decrease in the metal content of the activating solution as well as a decrease in pH as the activation progresses. The most frequently used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. However, catalysts of a very similar nature but differing among themselves as to one or more specific properties, may be prepared by using, instead of an aluminum salt, a hydrolyzable salt of a metal selected from group IIIB or from group IVA of the periodic system, and may be referred to in general as "silica-alumina type" catalysts. More particularly, salts of indium and thallium in addition to aluminum in group IIIB may be used, and salts of titanium, zirconium and thorium in group IVA may be used to treat silica gel and to prepare catalysts of this general type. Boron in the form of boric acid, or a soluble borate such as sodium borate, may be incorporated with silica gel. Whether prepared by this method or by some modification thereof, the catalyst will contain a major portion of silica and a minor portion of metal oxide. This minor portion of metal oxide, such as alumina, will generally not be in excess of 10 per cent by weight, and will more often, and generally more preferably, be between about 0.1 and 1.5 or 2 per cent by weight, on a dry basis.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and precipitate a silica hydrogel of proper consistency. Thus, phosphoric, acetic, nitric and boric acids may be used in certain instances. The gel should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble, hydrolyzable salt of one or more of the metals indicated, with the sulfate or chloride being preferred. Other alternate salts include acetates and nitrates. The adsorption of the hydrous oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unabsorbed salts and free acid, and the final drying which is performed at moderate temperatures produces hard, brittle granules of gel containing negligible quantities of compounds other than silica and the metal oxide or oxides.

Modifications may be made in the foregoing procedure and catalysts of suitable activity may result. One obvious alternative is the addition of the salt to the silicate before gelation. This method enables the incorporation of greater proportions of metal oxide, but activity may not be proportional to increasing metal oxide contents above about 1 to about 15 weight per cent so that little is gained by the modification and the proper degree of salt and acid removal may be more difficult. Non-uniform materials usually result from the mechanical mixing of hydrous metal oxide and silica gels, so that catalysts prepared in this manner may be less satisfactory. Other means of accomplishing the preparation may be devised, however, in view of the foregoing description.

As indicated above, the finished gel-type catalysts comprise essentially silica and metal oxides with variant quantities of water. The metal oxide may be present in minor activating quantities of about 1 to about 15 weight per cent of the total oxides. In many instances, catalytic activity may be as great with about 1 to 5 per cent of metal oxide as with about 10–15 per cent. Still greater amounts up to about 50 weight per cent may be added if desired, although the physical characteristics and activity of the catalyst may, at times, be adversely affected. In order to retain the selectivity of the catalyst for the present reaction, other heavy metal oxides or salts are usually absent from the starting materials and the finished gel. The catalyst is generally used as relatively coarse granules within a range of about 4 to about 20 mesh, but may be used as a fine powder in suspension in the reacting stream.

The activity of the catalysts prepared by this method is usually enhanced in the present process by a mild dehydration treatment at temperatures of about 250 to about 300° F. just prior to introduction of the hydrocarbon-hydrogen sulfide feed. The dehydration is usually accomplished by passing a stream of an inert hydrocarbon or other gas through the catalyst bed at the designated temperatures. Prior to this step, drying temperatures in the catalyst preparation procedure are not usually higher than subsequent initial operating temperatures. If the catalyst is dried excessively, especially at higher temperatures, it is less active in promoting the reaction between olefins and hydrogen sulfide.

The mixed olefin-hydrogen sulfide feed is passed through the catalyst bed, or otherwise reacted in contact with the catalyst, under controlled conditions with respect to the hydrogen sulfide-olefin mol ratio. In order to suppress undesirable side reactions and to favor mercaptan formation, it is desirable to employ a molal excess of hydrogen sulfide. Due to the high degree of specificity toward promotion of the mercaptan reaction exhibited by the preferred catalyst only a moderate excess of hydrogen sulfide is required. Satisfactory reaction mixtures may contain olefin-hydrogen sulfide ratios of between about 1:1 and about 1:6 with an intermediate preferred value of about 1:1.5. Ratios lower than 1:1 result in the increased formation of alkyl sulfides and considerable production of products of low molecular weight.

The temperature within the catalyst bed is chosen to conform with the catalyst activity, the feed composition, the operating pressure and the reaction time in order to secure most efficient conversion of the olefin to mercaptan. Suitable temperatures over the range of preferred operating conditions are usually within the range of about 100° F. to about 400° F. with a somewhat narrower range of about 200 to about 300° F. preferred. Higher temperatures may be employed in special cases, but in general the effect is to reduce the selectivity of the reaction. In the conversion of $C_{12}$ and higher olefins to the corresponding mercaptans the most advantageous temperature range with the active catalyst of this invention is between about 225 and about 275° F.

Since the mercaptan synthesis described hereinbefore is exothermic, means for dissipating, or taking up, any excess heat and preventing excessive temperature increases are ordinarily provided. Such means may include cooling the catalyst bed by internal or external heat exchange apparatus, or more conveniently by reducing the amount of preheat supplied to the feed ahead of the catalyst, or use of an inert diluent. Excessive temperatures tend to favor formation of thioethers and hydrocarbon decomposition products.

Catalyst life in the present process is ordinarily very long, since the relatively low temperatures and the mixed phase operation both tend to prevent the accumulation of tarry poisons and carbonaceous deposits. Thus, several hundred volumes of high-boiling mercaptan may often be produced per volume of catalyst before any significant change in activity is evident.

Operating pressures are chosen in accordance with reaction requirements. The desired mercaptan forming reaction is apparently promoted to some extent by pressure which may be effective by virtue of the increased hydrogen sulfide concentration at the active centers of the contact catalyst. Relatively high pressures also tend to prevent the formation of low-molecular weight mercaptans. The preferred pressures are usually in the range of about 100 to 3000 pounds gage, however operation is most conveniently and economically carried out between about 500 to about 1000 pounds gage pressure.

When temperature and pressure conditions are selected to conform with catalyst activity and desired extent of conversion, rather high flow rates of reactants may be employed. With the preferred catalysts of this invention flow rates as high as 10 liquid volumes of feed per hour per volume of catalyst may be employed.

As will be appreciated by one skilled in the art, other process modifications may be employed. A reaction mixture may be passed in a closed continuous cycle through a fixed catalyst bed, with reactants being continuously added near the entrance to the bed and with a portion of the circulating mixture being withdrawn from the system and with recovery of a desired mercaptan product, or fraction, from such portion. The catalyst, in finely divided form, may be suspended in the reaction mixture, which is then passed directly through the reaction zone or which may be reacted in a continuously circulating stream. In any of such modifications, the reaction mixture may be in a single phase, or in mixed vapor-liquid phases, with or without vaporization of a liquid phase during reaction to aid in temperature control.

The feed stocks for the process of manufacture of the desired high-boiling mercaptans may be derived from any suitable source such as catalytic polymerization units. In some cases it is desirable to utilize a feed rich in $C_{11}$–$C_{14}$ olefins, and commercial tri-isobutylene or a close cut fraction of heavy polymer produced in the catalytic polymerization of $C_2$ to $C_6$ olefins may be employed. The latter feed source is especially desirable, and a desired olefin stock is a by-product of aviation gasoline co-dimer production which affords an economically attracive integration of plant operations. Heavy polymer falling in the boiling range 335 to about 400° F. may be satisfactorily utilized in the present process for synthesis of mercaptans of 11 to 14 carbon atoms per molecule.

The hydrogen sulfide may also be derived from any convenient source. Hydrogen sulfide is particularly abundant as a by-product from petroleum refining processes and from natural gasoline treating plants. Pure hydrogen sulfide, while often desirable, is not essential to the successful operation of this invention. Carbon dioxide, which is often found as an impurity with hydrogen sulfide, tends to promote deactivation of the silica-alumina-type catalyst disclosed herein. It is generally preferred to have the concentration of this impurity not greater than about 5% of the hydrogen sulfide, for optimum results.

The process of recovering the high-boiling mercaptans from the catalyst effluent comprises a stabilization operation for the recovery of unreacted hydrogen sulfide, a stripping operation for the removal of unreacted olefin and/or hydrocarbon impurities and finally a flash distillation of the mercaptan product. The stripping and flash distillation operations may be carried out as diminished pressure operations as ordinarily carried out with vacuum pumps or with steam. Other methods of separating mercaptan from unreacted olefins and other material, especially solvent extraction, may be employed if desired.

In order to further illustrate the specific uses and advantages of the present invention, the following exemplary operations will be described. However, since these and numerous other process modifications will be obvious in the light of the foregoing disclosure, no undue limitations are intended.

Example I

A silica-alumina gel-type catalyst was prepared by the following sequence of operations: (1) formation of silica hydrogel by the introduction of sodium silicate solution into excess sulfuric acid; (2) removal of acid from the gel by water washing and reduction of the gel water content by partial drying to 1 to 2 mols of water per mol of $SiO_2$; (3) activation of gel with boiling solution of iron-free aluminum sulfate; (4) final washing and drying to form hard, glassy granules. This catalyst was used in 12/20 mesh size in the production of $C_{12}$ mercaptans, and contained about 1.5 per cent alumina by weight (on a dry basis).

The feed mixture contained hydrogen sulfide dissolved in tri-isobutylene to give an $H_2S$ to olefin mol ratio of 2:1. The liquid charge stock was fed to an electrically heated steel catalyst chamber containing 40 cc. of catalyst under a pressure of 500 p. s. i. g. The temperature of reaction was maintained at 250° F. at a feed rate of 1 to 2 liquid volumes per volume of catalyst per hour. The effluent product was treated to remove unreacted hydrogen sulfide and olefin. The yield of mercaptan amounted to 85 per cent of the converted tri-isobutylene.

Example II

A catalyst similar to that of Example I was used in the hydrogen sulfide-olefin synthesis. The olefin feed in this instance was a 340–390° F. fraction of heavy polymer from a catalytic polymerization unit treating a mixture of $C_3$ and $C_4$ olefins. The composition of this fraction consisted primarily of $C_{12}$ and $C_{13}$ olefins.

The feed for the mercaptan reaction was prepared by blending hydrogen sulfide to the olefin fraction in a mol ratio of 2:1. The feed blend was charged to the catalyst case under a pressure of 1000 p. s. i. g. A reaction temperature of 250° F. was maintained at a charge rate of 2 liquid volumes per volume of catalyst per hour. The effluent raw product was washed to remove $H_2S$ and then fractionally distilled under reduced pressures to remove unreacted olefin. The final product assayed 95 per cent mercaptan boiling between 430 and 480° F. at 750 mm. pressure. Under these conditions only a minor quantity of $C_8$ and lighter mercaptans were made with substantially no alkyl thioethers.

Similar results are obtained with a silica-zirconia catalyst, prepared by a procedure similar to that given in Example I for the silica-alumina catalyst.

Example III

A silica-alumina catalyst comparable to those used in Examples I and II was prepared for this run. Reaction conditions were the same as described in Example II with the only change being in the feed composition. In this instance the $H_2S$-olefin ratio was reduced from 2 to 1.7. No appreciable change in yield or quality of product was observed.

When using a catalyst comprising about 95% silica and 5% of alumina and zirconia, prepared in a manner described in Example I, similar results are obtained.

Example IV

Conditions pertaining to catalyst composition, reaction temperature and reaction pressure were essentially those employed in Example II. The olefin feed comprised a 338–360° F. fraction of heavy propylene-butylene polymer. The hydrogen sulfide concentration of the feed for this run was reduced to 0.5 mol of $H_2S$ per mol of olefin. At a flow-rate of 4 liquid volumes per volume of catalyst per hour it was found that a greatly reduced yield of desired $C_{12}$ mercaptans resulted.

Example V

Heavy butylene polymer having a boiling range of 336 to 381° F. was blended with hydrogen sulfide in a molal ratio of 1:1.5 to prepare the feed for this run. Other reaction conditions were essentially those employed in Example IV. The yield of $C_{12}$ and heavier mercaptans corresponded to about 65 per cent of theory. Approximately 34 per cent of the olefin was converted per pass.

The foregoing disclosure has included detailed descriptions of the operation and the outstanding advantages of the process of this invention, and further illustrated specific application thereof. Other applications and modifications of this process will be apparent from the disclosure and valuable in proportion to the benefits thereof.

I claim:

1. In the catalytic reaction of olefins with hydrogen sulphide, the improvement which comprises conducting said reaction in the presence of a synthetic gel catalyst comprising a major portion of silica and a minor portion of an oxide of a metal selected from the class consisting of aluminum and zirconium and prepared by contacting an acidic hydrous silica gel with an aqueous solution of a hydrolyzable salt of said metal to adsorb said metal as a hydrous oxide, and subsequently washing and drying said treated gel.

2. A process according to claim 1 in which said minor portion of metal oxide is not in excess of 10 per cent by weight on a dry basis.

3. A process for producing a mercaptan which comprises reacting together an olefin hydrocarbon and at least a stoichiometrical amount of hydrogen sulfide at a reaction temperature between about 100 and 400° F. in the presence of a synthetic gel catalyst comprising a major portion of silica and a minor portion of an oxide of a metal selected from the class consisting of aluminum and zirconium and prepared by contacting an acidic hydrous silica gel with an aqueous solution of a hydrolyzable salt of said metal to adsorb said metal as a hydrous oxide, and subsequently washing and drying said treated gel.

4. A process for producing a mercaptan which comprises reacting together an olefin hydrocarbon and at least a stoichiometrical amount of hydrogen sulfide at a reaction temperature between about 100 and 400° F. in the presence of a synthetic gel catalyst comprising a major portion of silica and a minor portion of alumina and prepared by contacting an acidic hydrous silica gel with an aqueous solution of a hydrolyzable salt of aluminum to adsorb on said silica hydrous alumina, and subsequently washing and drying said treated gel.

5. A process according to claim 4 in which said minor portion of alumina is from about 0.1 to 2 per cent by weight on a dry basis.

6. A process according to claim 5 in which said hydrolyzable salt of aluminum is aluminum sulfate.

7. A process according to claim 5 in which said hydrolyzable salt of aluminum is aluminum chloride.

8. A process for producing a mercaptan which comprises reacting together an olefin hydrocarbon and at least a stoichiometrical amount of hydrogen sulfide at a reaction temperature between about 100 and 400° F. in the presence of a synthetic gel catalyst comprising a major portion of silica and a minor portion of zirconia and prepared by contacting an acidic hydrous silica gel with an aqueous solution of a hydrolyzable salt of zirconium to adsorb on said silica hydrous zirconia, and subsequently washing and drying said treated gel.

9. A process for producing a mercaptan which comprises reacting together an olefin hydrocarbon and at least a stoichiometrical amount of hydrogen sulfide at a reaction temperature between about 100 and 400° F. in the presence of a synthetic gel catalyst comprising a major portion of silica and a minor portion of alumina and zirconia and prepared by contacting an acidic hydrous silica gel with aqueous hydrolyzable salts of aluminum and zirconium to adsorb on said silica hydrous alumina and zirconia, and subsequently washing and drying said treated gel.

10. A process for producing mercaptans having at least twelve carbon atoms per molecule which comprises reacting an olefin having at least twelve carbon atoms per molecule with hydrogen sulfide at a reaction temperature not greater than about 400° F. in the presence of a synthetic gel catalyst comprising a major portion of silica and a minor portion of alumina and prepared by contacting an acidic hydrous silica gel with an aqueous solution of a hydrolyzable salt of aluminum to adsorb on said silica hydrous alumina, and subsequently washing and drying said treated gel.

11. A process for preparing mercaptans of high molecular weight, which comprises separating from effluents of an olefin polymerization process an olefinic hydrocarbon fraction boiling not lower than about 335° F. and not higher than about 400° F., reacting said olefinic fraction with hydrogen sulfide at a reaction temperature between about 200 and about 300° F. in the presence of a synthetic gel catalyst comprising a major portion of silica and a minor portion of alumina and prepared by contacting an acidic hydrous silica gel with an aqueous solution of a hydrolyzable salt of aluminum to adsorb on said silica hydrous alumina, and subsequently washing and drying said treated gel, and recovering from effluents of said reaction a mercaptan fraction comprising mercaptans of high molecular weight so produced.

12. In the catalytic reaction of olefins with hydrogen sulfide, the improvement which comprises conducting said reaction in the presence of a synthetic gel catalyst comprising silica and alumina and prepared by first forming a hydrous silica gel by introduction of sodium silicate solution into excess acid, water-washing the gel, partially drying the washed gel, activating same with an aqueous solution of an aluminum salt to form by hydrolysis hydrous alumina adsorbed on the gel in such amount to produce a finished catalyst containing from 0.1 to 2 per cent alumina by weight on a dry basis, washing the activated gel, and drying the washed activated gel to form hard glassy granules of finished catalyst.

13. A process according to claim 12 in which said aluminum salt is aluminum sulfate.

WALTER A. SCHULZE.

REFERENCES CITED

The following references are of record in the file of this patent:

UNITED STATES PATENTS

| Number | Name | Date |
|---|---|---|
| 1,836,170 | Johansen | Dec. 15, 1931 |
| 1,836,171 | Johansen | Dec. 15, 1931 |
| 1,836,183 | Nisson | Dec. 15, 1931 |
| 2,052,268 | Williams | Aug. 25, 1936 |
| 2,101,096 | Reuter | Dec. 7, 1937 |
| 2,116,182 | Baur | May 3, 1938 |
| 2,211,990 | Shoemaker | Aug. 20, 1940 |

OTHER REFERENCES

Duffey, "Industrial and Engineering Chem.," vol. 26, pp. 91–93, 1934.